United States Patent
Segletes et al.

(10) Patent No.: US 8,568,855 B2
(45) Date of Patent: Oct. 29, 2013

(54) INSULATION MATERIALS HAVING APERTURES FORMED THEREIN

(75) Inventors: David S. Segletes, York, SC (US); Zhaohui Han, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 63 days.

(21) Appl. No.: 13/155,456

(22) Filed: Jun. 8, 2011

(65) Prior Publication Data

US 2012/0315435 A1 Dec. 13, 2012

(51) Int. Cl.
*B32B 3/24* (2006.01)

(52) U.S. Cl.
USPC .................. 428/137; 428/138; 219/121.7

(58) Field of Classification Search
USPC .................. 428/137, 138; 219/121.7
See application file for complete search history.

(56) References Cited

U.S. PATENT DOCUMENTS

| | | | |
|---|---|---|---|
| 1,730,740 A | 10/1929 | Morrison | |
| 3,069,302 A | 12/1962 | Lewis et al. | |
| 3,127,470 A | 3/1964 | Anderson et al. | |
| 3,674,615 A | 7/1972 | Dardenne | |
| 4,559,264 A | 12/1985 | Hoda et al. | |
| 4,606,785 A | 8/1986 | Zeise | |
| 5,605,693 A * | 2/1997 | Seare, Jr. | 424/400 |
| 5,757,134 A | 5/1998 | Williamson | |
| 6,190,775 B1 | 2/2001 | Smith et al. | |
| 6,585,926 B1 * | 7/2003 | Mirzaee | 264/400 |
| 6,858,282 B2 * | 2/2005 | Temme | 428/131 |
| 7,651,963 B2 | 1/2010 | Smith et al. | |
| 7,776,392 B2 | 8/2010 | Smith et al. | |
| 7,846,853 B2 * | 12/2010 | Stevens et al. | 442/117 |
| 2005/0208301 A1 | 9/2005 | Okamoto et al. | |
| 2005/0274774 A1 | 12/2005 | Smith et al. | |
| 2007/0114704 A1 | 5/2007 | Stevens et al. | |
| 2008/0050580 A1 | 2/2008 | Stevens et al. | |
| 2010/0108278 A1 | 5/2010 | Smith et al. | |
| 2010/0112303 A1 | 5/2010 | Smith et al. | |

FOREIGN PATENT DOCUMENTS

| | | |
|---|---|---|
| DE | 1090733 B | 10/1960 |
| GB | 778234 A | 7/1957 |
| GB | 901016 A | 7/1962 |
| GB | 1024700 A | 3/1966 |

* cited by examiner

Primary Examiner — William P Watkins, III

(57) ABSTRACT

An improved electrical insulation tape (16) comprising a backing layer (20) and an electrical insulation layer (18) bonded to the backing layer (20) is provided. At least one of the electrical insulation layer (18) and the backing layer (20) includes a plurality of apertures (26) formed therein to improve flow of impregnating resin into the insulation tape (16) during resin impregnation.

10 Claims, 5 Drawing Sheets

INSULATION MATERIALS HAVING APERTURES FORMED THEREIN

FIELD OF THE INVENTION

The present invention relates in general to the field of electrical insulation tapes, and more particularly to electrical insulation materials and methods for the improved impregnation of resins into the electrical insulation materials.

BACKGROUND OF THE INVENTION

High voltage windings are used in various dynamoelectric machines, such as motors or generators. For example, high-voltage windings commonly referred to as stator windings are used in high-voltage electrical generators. A high-voltage winding, such as a stator winding, can be formed from at least one winding bar that, in turn, comprises one or more electrical conductors. The individual electrical conductors are formed of a highly conductive material, such as copper. The electrical conductors are typically individually insulated and bundled together to form the winding bar. The bundle, in turn, is surrounded by insulation, and is often referred to as a winding insulator or groundwall insulator. The groundwall insulator typically includes multiple layers of an insulation tape, such as a glass-backed mica tape. Overlaying the groundwall is an outer conductive ground electrode that surrounds the groundwall insulator. The outer conductive ground electrode can be a coating of conductive paint or a wrapped conductive tape over the groundwall insulator. The outer conductive ground electrode is connected to ground so that the voltage of the outer surface of the high-voltage winding is at ground potential.

The tape may be applied half lapped, abutted or in any other suitable manner. Generally, multiple layers of the mica tape are wrapped about the coil with sixteen or more layers generally being used for typical high voltage coils. The number of layers may be decreased depending on the power of the generator and the effectiveness of the insulator in both its abilities to insulate electrically and conduct heat. To impart better abrasion resistance and to secure a tighter insulation, a wrapping of an outer tape of a tough fibrous material, for example, glass fiber, asbestos or the like may be applied to the coil.

The insulation tape is generally impregnated with a resin to improve its overall properties. There are many methods of coating materials with epoxy resins and then curing the product. One such method is vacuum pressure impregnation (VPI). This method is used on devices such as stator conductor coils. The insulation tape is applied to the coils, then the coils are placed in a vacuum vessel and a vacuum is applied. After a period of time, resin is admitted to impregnate the coils. Pressure is applied to force the resin into the coils and minimize voids, which will affect conductivity. After this is completed, the coils are heated to cure the resin. A variation of this, global VPI (GVPI), involves the process wherein dry insulated coils are wound, and then the whole stator is vacuum pressure impregnated rather than the individual coils. Due to the relatively high density of present insulation tapes, there are commonly issues with optimally impregnating such tapes, such as incomplete impregnation. Incomplete impregnation may lead to the inability of the coil to resist voltage stresses and cause premature breakdown and failure.

BRIEF DESCRIPTION OF THE DRAWINGS

The invention is explained in the following description in view of the drawings that show.

DETAILED DESCRIPTION OF THE INVENTION

The present inventors have innovatively developed an insulation tape that substantially improves the flow of an impregnating resin into the insulation tape during resin impregnation. In one embodiment, the insulation tape includes at least an insulation layer and a plurality of apertures (holes) formed therein by laser drilling or the like. In some embodiments, the apertures have a largest dimension of ten microns or less such that resin impregnation into the tape can be improved while the electrical performance of the insulation tape is not degraded. In this way, the improved insulation tapes improve resin impregnation, but are also able to withstand the stresses and forces experienced by the tapes during manufacturing and in service.

Figure 1:
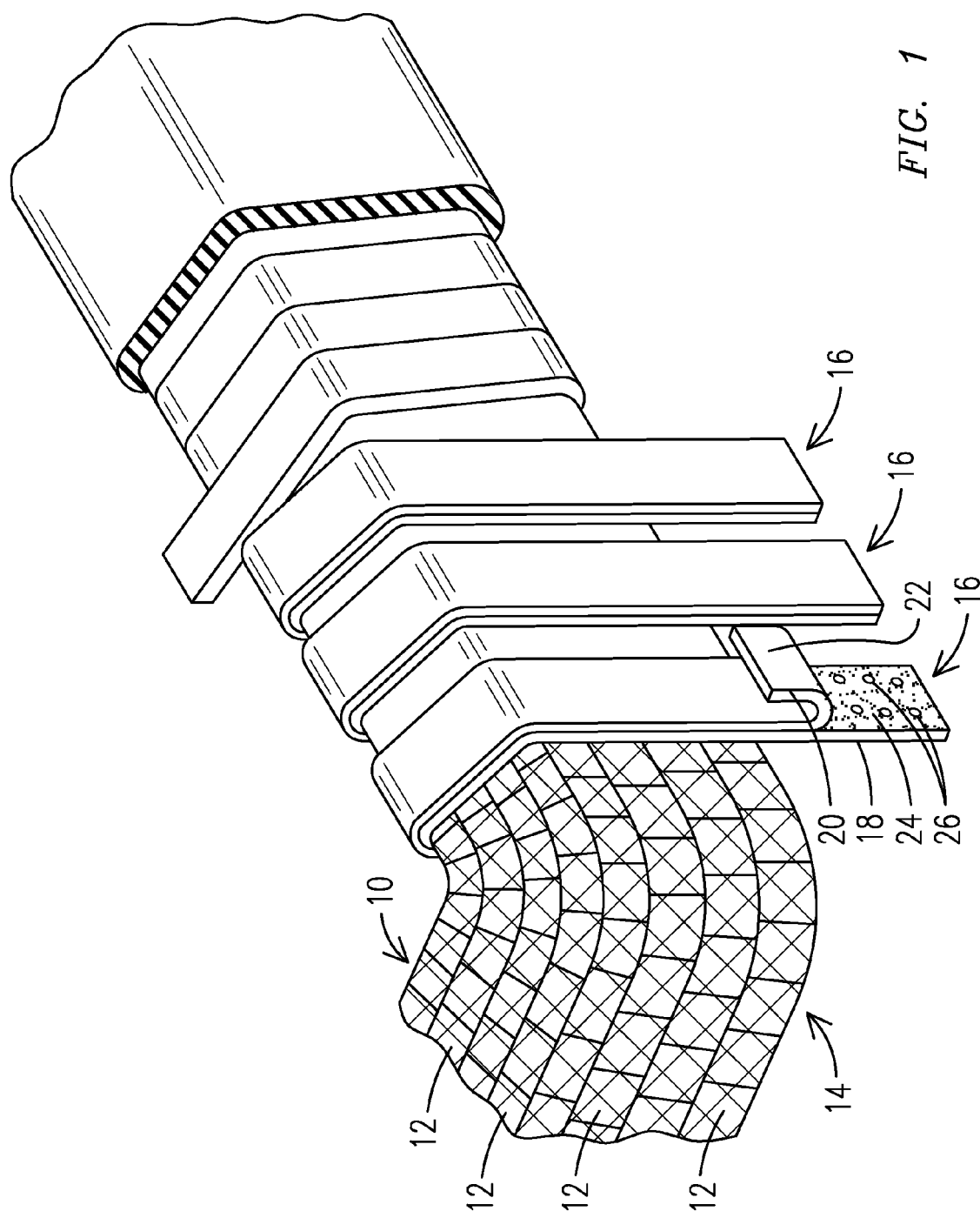
FIG. 1 depicts an insulation tape being lapped around a stator coil in accordance with an aspect of the present invention.

Referring now to the figures, FIG. 1 shows an exemplary environment for the insulation tapes of the present invention. Exemplary coil 10 comprises a plurality of turns of conductors 12 that are assembled into a bakelized coil 14. Ground insulation for the coil 14 is provided by wrapping one or more layers of electrical insulation tape (insulation tape) 16 about the bakelized coil 14. The insulation tape 16 typically comprises an electrical insulation layer (insulation layer) 18 combined or bonded to a backing layer or backing sheet 20 by a liquid resinous binder 22.

In one embodiment, the insulation layer 18 comprises a plurality of mica flakes that have been formed into a mica sheet by traditional paper making processes as are known in the art. Mica is known to be a desirable insulator due to the size of the mica flakes and flakelets. The mica may be standard mica (muscovite, phlogopite), biotite mica, or any other suitable mica-like alumino-silicate materials, such as kaolinite, halloysite, montmorillonite, and chlorite. The size ranges that the mica can be formed into can be varied, but generally the mica is in the macro-sized (e.g., 0.01-0.05 mm) thickness range with longest platelet dimensions of up to 10 mm for naturally occurring and conventionally processed micas (including all known common mineral forms). For synthetic micas, the longest dimension size range may be in the micron and sub-micron range from 100 nm to 10,000 nm. Mica is not only good at forming paper, but since the platelets create high tortuosity pathways for electrical treeing processes, it is also an excellent electrical insulation material. Mica, unfortunately, is also very thermally insulating as well, which is an undesired side effect.

In another embodiment, the insulation tape 16 may further include high thermal conductivity (HTC) materials 24, which may be combined with the mica at any suitable stage in the production of the mica paper, such as in the dry material stage, the slurry stage, or the final product as described in U.S. Pat. No. 7,846,853, the entirety of which is incorporated by reference herein. Mica papers typically have structures, which can be readily intercalated with such HTC materials such as metal oxides, nitrides, and carbides, organic compounds and monomers and polymers to give high dielectric strength composites. The HTC materials 24 may instead or further be included in the resin that is impregnated into the insulation tape 16.

The HTC materials 24 may include any suitable particles that increase the thermal conductivity of the host matrix. The HTC materials may comprise nano-, meso- and/or micro-sized particles. In one embodiment, the HTC materials 24 comprise nanofillers having a dimension of from 1-1000 nm. The nanofillers may be spherical, may be platelets, may be a shape having a high aspect ratio such as whiskers, rods or nanotubes, and/or may be in assembled forms, such as aggregates, fibrillar dendrites, ropes, bundles, nets, and other forms. The HTC materials 24 may also include coatings, such as diamond-like coatings or other high thermal conductivity materials, such as metal oxides, nitrides, and carbides, which are disposed on materials of a lower thermal conductivity. Further, the HTC particles may include inorganic or organic surface functional groups that are reactively grafted to the HTC materials, which may form direct or indirect covalent bonds (linkages) with the impregnating resin to form a continuous composite material. In one embodiment, the HTC materials are bonded directly to the impregnating resin via one or more covalent bonds. Specific examples of suitable HTC materials are disclosed in U.S. Pat. No. 7,781,063, the entirety of which is hereby incorporated by reference.

The impregnating resin impregnated into the insulating tape 16 may be any suitable resin or epoxy resin, including modified epoxies, polyesters, polyurethanes, polyimides, polyesterimides, polyetherimides, bismaleimides, silicones, polysiloxanes, polybutadienes, cyanate esters, hydrocarbons, etc., as well as homogeneous blends of these resins. Furthermore, the impregnating resin may include additives such as cross-linking agents, accelerators and other catalysts and processing aids. Certain resins, such as liquid crystal thermosets (LCT) and 1,2 vinyl polybutadiene combine low molecular weight characteristics with good cross-linking properties.

The insulation layer 18 is typically combined with the pliable backing layer 20 (backing layer 20) with the resinous binder 22. The pliable backing layer 20 may comprise a glass fiber cloth or a polyethylene glycol terephthalate mat, for example. The resinous binder 22 may be any suitable binder material, such as an epoxide material as is known in the art.

As mentioned above, the insulation tape 16 may be applied half-lapped, abutted or in any other suitable manner about a suitable conductor. Generally, multiple layers of the insulation tape 16 are wrapped about the bakelized coil 14 with sixteen or more layers generally being used for high voltage coils. The number of layers may be decreased depending on the power of the generator and the effectiveness of the insulator in both its abilities to insulate electrically and conduct heat. Thereafter, the insulation tape 16 is generally impregnated with a resin to improve many of its overall properties. In one embodiment, the impregnation is done by vacuum pressure impregnation (VPI) or global vacuum pressure impregnation (GVPI).

Figure 2:
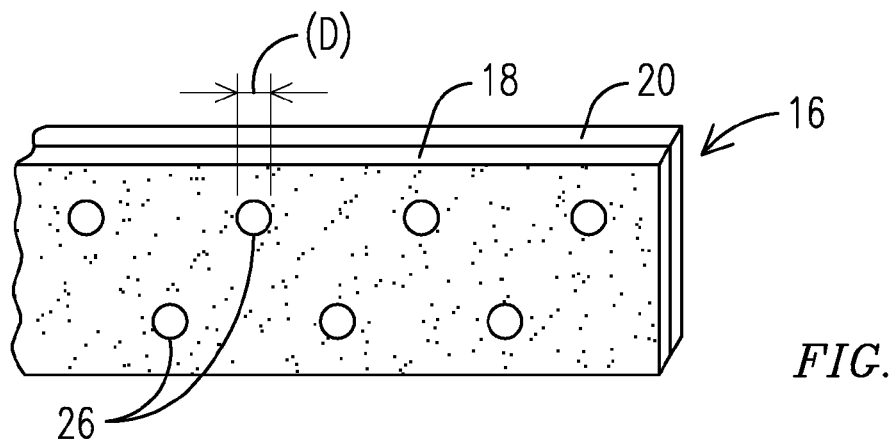
FIG. 2 depicts an insulation tape having a plurality of apertures formed therein in accordance with an aspect of the present invention.

The insulation tapes of the present invention significantly improve the flow of the impregnation resin therein during resin impregnation. Referring now to FIG. 2, there is shown an embodiment of an improved insulation tape, e.g., insulation tape 16, in accordance with an aspect of the present invention. The insulation tape 16 comprises at least the insulation layer 18 and a plurality of spaced apart apertures 26 formed therein. The apertures may be of any size as is appropriate for the particular application. In one embodiment, the apertures 26 are sized so as to provide the necessary robustness toward electric field stress. In a particular embodiment, the apertures 26 have a largest dimension of ten microns (10μ) or less. For example, in one embodiment, the apertures 26 have a diameter (D) (as shown in FIG. 2) of ten microns (10μ) or less for maintaining the structural and electrical integrity of the mica sheet and for allowing improved impregnation with the resin.

In addition, it is appreciated that the depth of the apertures 26 may also be controlled to avoid mica puncture or to encourage it as is desired. Accordingly, in any of the embodiments described herein, the depth of the apertures may be controlled such that the apertures 26 partially or wholly extend through only one of the insulation layer 18 or the backing layer 20 to a desired degree. In further embodiments, the apertures 26 may be formed in both the insulation layer 18 and the backing layer 20, but without the apertures 26 having a depth that extends completely through both the insulation layer 18 and/or backing layer 20. In other embodiments, the apertures 26 extend through both the insulation layer 18 and the backing layer 20. It is appreciated, however, that in the latter embodiment, the apertures 26 will need to be sufficiently small in diameter and a relatively low viscosity impregnating resin will need to be utilized for such a system to function properly.

Figure 3:
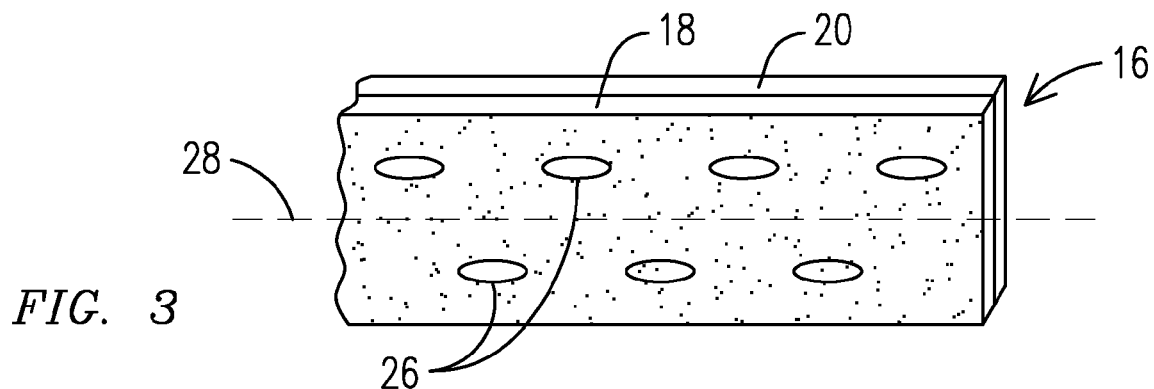
FIG. 3 depicts an insulation tape having a plurality of apertures oriented parallel to a longitudinal axis of the insulation tape in accordance with an aspect of the present invention.

In addition, the apertures 26 may be of any suitable shape for allowing improved flow of resin through the insulation tape 16. In one embodiment, the apertures 26 have a relatively round shape as is also shown in FIG. 2. The relatively round shape aids in providing an improved permeability of the resin in the insulation tape 16. In another embodiment, as shown in FIG. 3, the apertures 26 have a substantially oval or elongated shape. It is noted that the size of the apertures 26 as shown in the figures is not necessarily to scale, but are enlarged for purposes of clarity.

Figure 4:
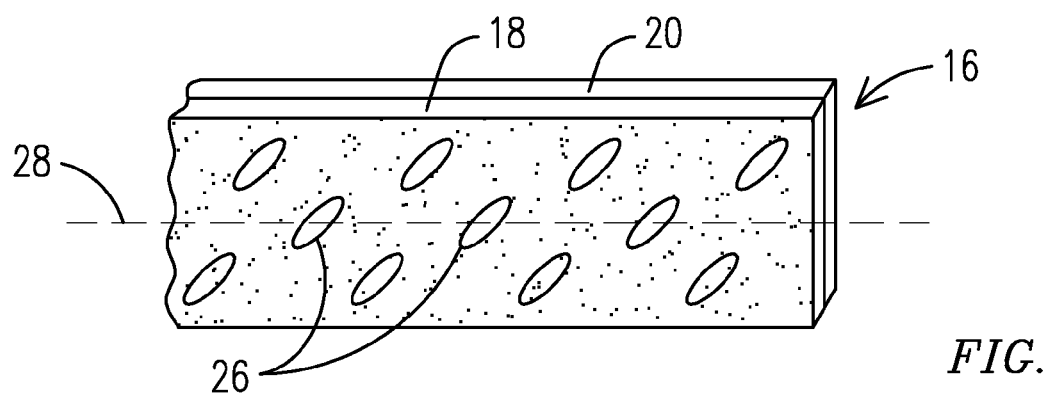
FIG. 4 depicts an insulation tape having a plurality of apertures oriented at an angle to a longitudinal axis of the insulation tape in accordance with an aspect of the present invention.

Further, the apertures 26 may have any desired orientation relative to a longitudinal axis 28 of the insulation tape 14. In one embodiment, as shown in FIG. 3, at least a portion of the apertures 26 are oriented parallel to the longitudinal axis 28 of the insulation tape 16. In another embodiment, as shown in FIG. 4, the apertures 26 may be oriented in an angled position, e.g., at a 45 degree angle, relative to the longitudinal axis 28 of the insulation tape 14. The apertures 26 may cover any suitable surface area of the insulation tape 14.

Figure 5A:
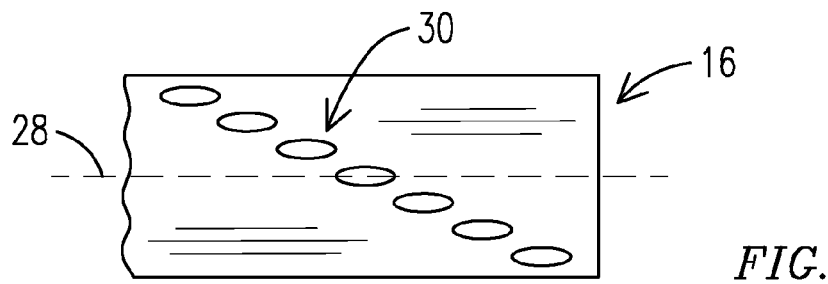
FIGS. 5A-5E show exemplary patterns for apertures in an insulation tape in accordance with an aspect of the present invention.
Figure 5B:
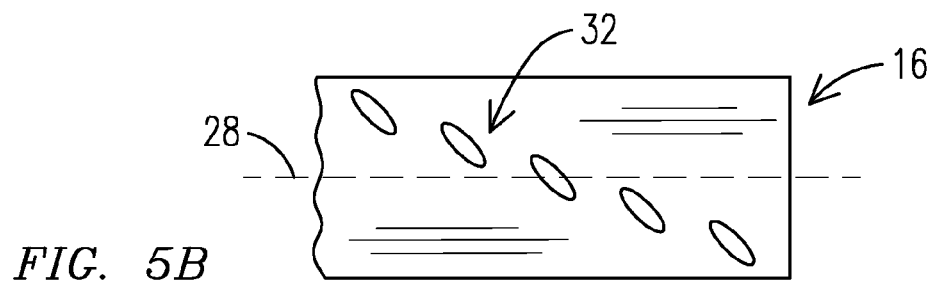
Figure 5C:
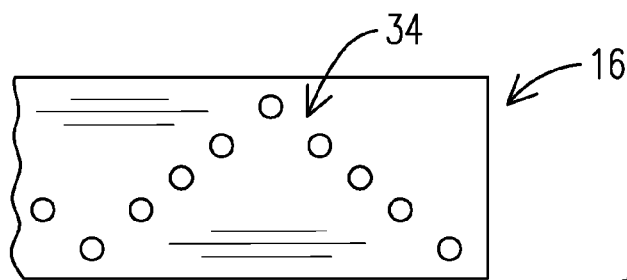
Figure 5D:
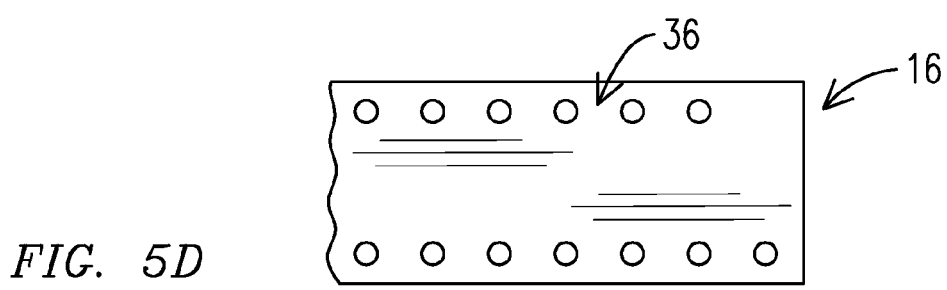
Figure 5E:
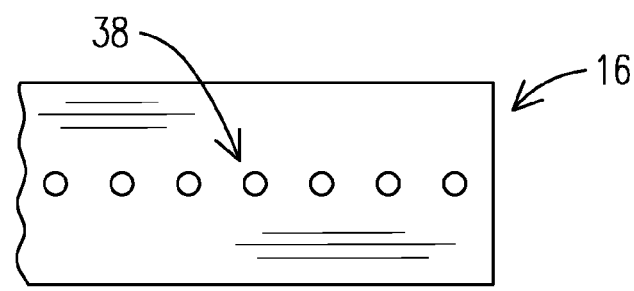

The apertures 26 can be provided in the insulation tape 16 in any suitable pattern that will aid in improving the flow of the impregnating resin into the insulation tape 16 while maintaining an electrical strength and structural strength thereof. FIGS. 5A-5E illustrate exemplary patterning of the apertures 26 for the insulation tape 16. As shown in FIG. 5A, for example, the apertures 26 may be formed in the insulation tape 16 in a diagonal pattern 30 with the longest dimension of the apertures 26 oriented parallel to the longitudinal axis 28 of the insulation tape 16. As shown in FIG. 5B, the apertures 26 may be formed in the insulation tape 16 in a diagonal pattern 32 with the longest dimension of the apertures 26 oriented at an angle, e.g. 45°, to the longitudinal axis 28 of the insulation tape 16. As shown in FIG. 5C, the apertures 26 may be formed in a zigzag pattern 34 across the insulation tape 16. As shown in FIG. 5D, the apertures 26 may include edging 36 (apertures formed along an edge of the tape 16) such that a tight overlapping of the insulation tape 16 will use the edging 36 to provide for the apertures 26 in each layer of insulation tape 16 in a wrapping. As shown in FIG. 5E, the insulation tape 16 may also include centering 38, which will take greater advantage of a half-lap lapping. Alternatively, the apertures 26 may be disposed in any other desired arrangement to increase permeability of the insulation tape 16 to impregnating resin, including but not limited to grids and banding. The various types of patterning are not mutually exclusive and may be combined with one another.

Figure 6:
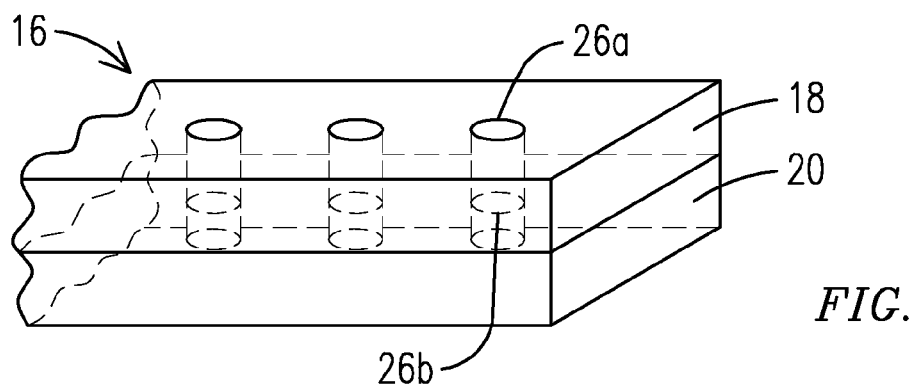
FIG. 6 depicts an insulation tape having a plurality of apertures that extend through the insulation layer and into, but not all the way through, the backing layer in accordance with an aspect of the present invention.
Figure 7:
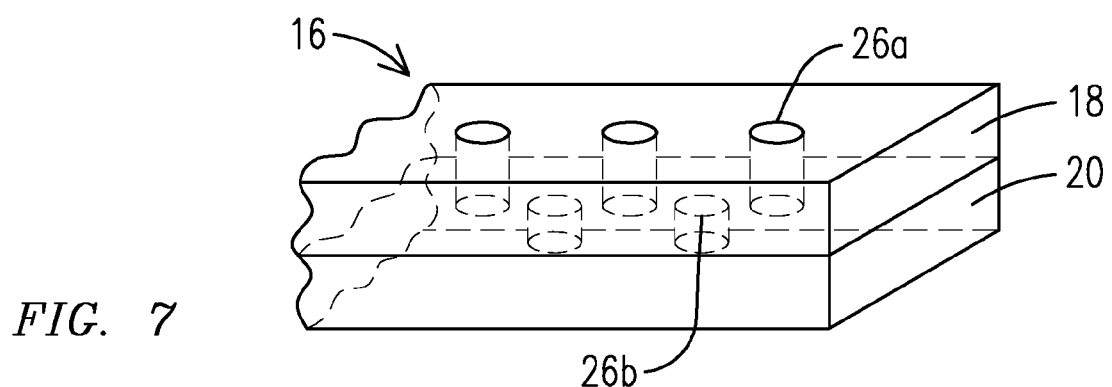
FIG. 7 depicts an insulation tape having an insulation layer with a plurality of apertures and a backing layer with a plurality of apertures that are offset from the apertures of the insulation layer in accordance with an aspect of the present invention.

It is further contemplated that when the insulation tape 16 comprises an insulation layer 18 and a backing layer 20, the apertures 26 described herein may be incorporated into one or both of the insulation layer 18 and the backing layer 20. In one embodiment, the apertures 26 are formed solely in the insulation layer 18 as was shown in FIG. 2, for example, and not in the backing layer 20. In another embodiment, the apertures 26 are formed solely in the backing layer 20, but not the insulation layer 18. In yet another embodiment, the apertures 26 are formed into the insulation layer 18 and the backing layer 20. When the apertures 26 are formed in both the insulation layer 18 and the backing layer 20, the apertures 26a in the insulation layer 18 and the apertures 26b in the backing layer 20 may be oriented relative to one another in any suitable configuration. In one embodiment, as shown in FIG. 6, the apertures 26a of the insulation layer 18 and the apertures 26b of the backing layer 20 are substantially aligned with one another in a vertical plane. In an alternate embodiment, as shown in FIG. 7, the apertures 26a of the insulation layer 18 and the apertures 26b of the backing layer 20 may be substantially misaligned with one another in a vertical plane.

Figure 8:
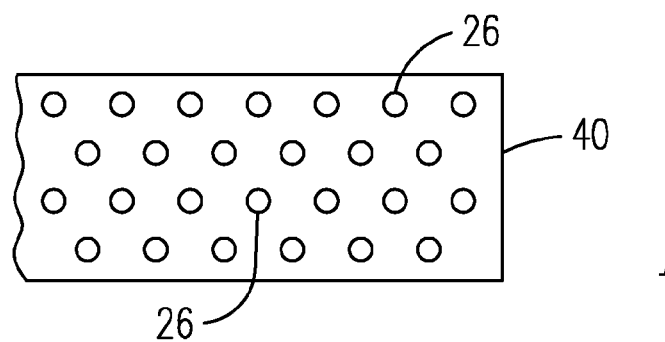
FIG. 8 depicts a structurally stable mica sheet (without a backing layer) having a plurality of apertures formed therein in accordance with an aspect of the present invention.

It is appreciated that the present invention is not limited to insulation tapes having an insulation layer and a backing material. In certain aspects of the present invention, as shown in FIG. 8, the insulation layer 16 may be provided as a standalone, single layer, structurally stable sheet 40 without a backing layer 20. The structurally stable sheet 40 may have a plurality of apertures 26 formed therein as in any embodiment described above. The sheet 40 may be formed from mica or any other suitable insulation material and may or may not include high thermal conductivity materials as described herein. Optionally, after apertures 26 are formed in the sheet 40, the sheet 40 may be combined with a backing material (with or without apertures) as described herein, e.g., backing layer 20, and adhered thereto by a liquid resinous binder.

In accordance with another aspect of the present invention, there is provided a method of manufacturing an insulation material in any embodiment described herein. The insulation material may comprise an insulation tape 16 or a structurally stable mica sheet 40 as described above. The method comprises forming a plurality of apertures 26 in the insulation material. In one embodiment, the apertures 26 have a predetermined diameter and depth. The forming may be done by any suitable method known in the art, such as by mechanical spike rollers or laser drilling. In one embodiment, the forming is done by laser drilling. Laser drilling removes material from the insulation material to create the apertures 26. The laser wavelength and intensity may be selected so as to interact with the insulation material in a controlled manner as would be appreciated by one skilled in the art.

In accordance with another aspect of the present invention, the laser drilling may selectively remove components (e.g., a first component) from an insulation material, e.g., insulation tape 16 or structurally stable sheet 40, while leaving other components (e.g., a second component) substantially intact. It is understood that the wavelength of the laser will have a significant effect, as the material reflectivity of one component, e.g., an HTC material such as boron nitride, may be vastly different from that of a second component, such as mica. Hence, the power required to vaporize/remove material may be very different for HTC materials and mica, for example. As such, the methods described herein optionally include selectively removing components, such as one of mica and HTC materials, from a substrate, e.g., insulation tape 16 or structurally stable sheet 40, while leaving the other component, such as the other of mica and HTC materials, substantially intact.

The laser drilling may be done by percussion drilling or trepanning, for example. In percussion drilling, a beam is focused on the substrate, e.g., insulation tape 16, to a spot equal to the diameter of the aperture to be formed. In trepanning, the laser may be moved with respect to the substrate to form apertures with a desired diameter and depth. Suitable laser drilling equipment is available from a variety of sources, including but not limited to U.S. Laser Corp., Wyckoff, N.J.

Figure 9:
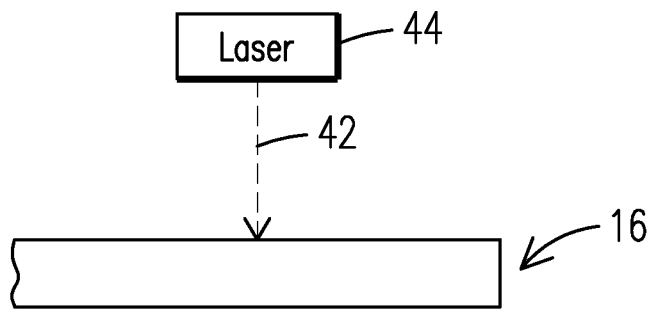
FIG. 9 depicts a laser source for forming a plurality of apertures in an insulation tape in accordance with an aspect of the present invention.
Figure 10:
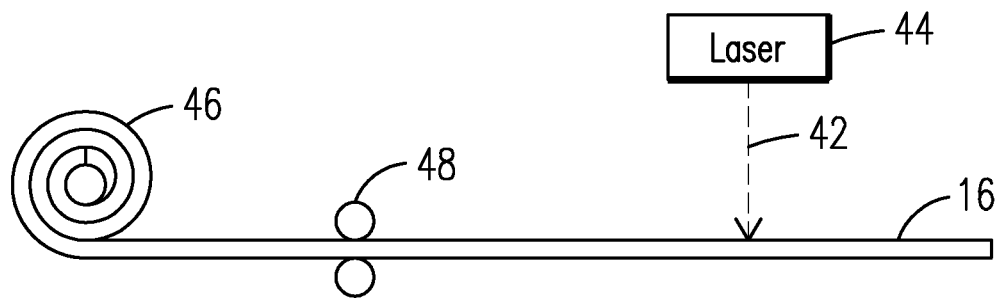
FIG. 10 depicts a system for forming a plurality of apertures in an insulation tape in accordance with an aspect of the present invention.

In one embodiment, as shown in FIG. 9, a beam 42 from a laser source 44 is directed on the insulation material (e.g., insulation tape 16) and the plurality of apertures 26 are formed in the insulation tape 16 while the insulation tape 16 is maintained in a stationary position. In another embodiment, as shown in FIG. 10, the insulation material is conveyed along a conveyor to provide a continuous source of the insulation material and the apertures 26 are formed in the insulation material as the insulation material is conveyed past the laser source 44. For example, in one embodiment, a roll 46 of the insulation material, e.g., insulation tape 16, is provided that forms a source of supply for dispensing a strip of the insulation tape 16. One or more rollers 48 may be provided to guide the insulation tape 16 off the roll 46 toward the laser source 44. In another embodiment (not shown), the insulation layer 18 and the backing layer 20 are separately conveyed off of separate rolls and may be joined together prior to or after contact of either layer with the laser beam 42 of the laser source 44. In any of the embodiments described herein, the depth of the apertures may be controlled such that the apertures are partially or wholly formed in either the insulation layer 18 or the backing layer 20 individually, or in both. The depth of the apertures may also be controlled so as to avoid mica puncture or to encourage the same. When the insulation material is conveyed past the laser source 44, it is generally understood that more powerful laser sources are likely to have a repetition rate no greater than 1 kHz, which will likely limit the throughput speed of the insulation material.

Figure 11:
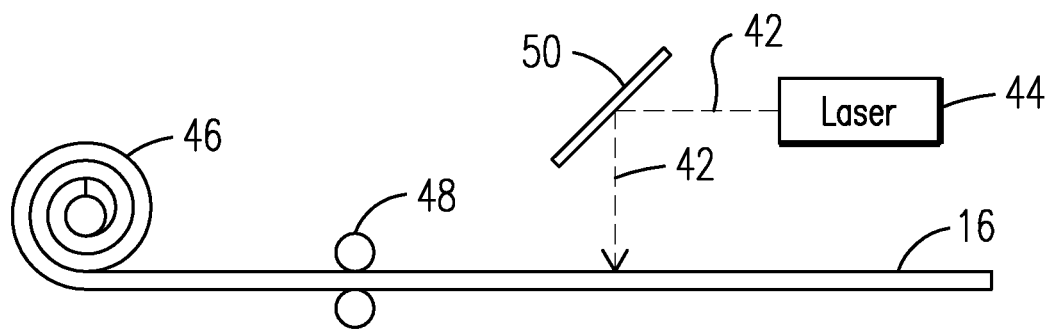
FIG. 11 depicts another system for forming a plurality of apertures in an insulation tape in accordance with an aspect of the present invention.

The laser source 44 may be a fiber optic laser source, or any other suitable laser source known in the art. In operation, the laser source 44 directs a beam toward the insulation tape 16 to form a plurality of the apertures 26 in the insulation tape 16. It is appreciated that one skilled in the art would understand that the speed of travel of the insulation material along with the wavelength, pulse width, and pulse frequency of the laser source may be varied as necessary to form apertures 26 having a desired dimension in the insulation material, including but not limited to a desired shape, height, width, and/or depth. To achieve apertures 26 having a rounded shape, a movable mirror 50 may be provided to guide the laser beam 42 from the laser source 44 onto the insulation material, e.g., insulation tape 16, and form the rounded shape as the insulation tape 16 is conveyed past the laser source 44 as shown in FIG. 11.

In addition to the above considerations, one skilled in the art would appreciate that the amount of diffraction, the selection of a particular laser source, and the selected wavelength of the laser source 44 will have an effect on the number and dimensions of the apertures 26. Further, the number of and dimensions of the apertures 26 may be influenced by the beam shape of the laser source 44 and any structures which help create the desired beam shape. The laser source 44 and such other structures can be tailored to provide circular, ellipsoidal and top hat intensity profiles using various structures known in the art. For example, the "natural" beam profile from excimer lasers is generally "top-hat" in profile, rather than a Gaussian beam. In one embodiment, the laser beam 42 is subjected to spatial filtering, and is thereafter focused on the insulation material to make a single spot or aperture. The minimum spot size is equal to about the wavelength of the laser, but this minimum is degraded the more the spot departs from a Gaussian profile. In another embodiment, the location of the single spot can be controlled by moving the insulation material, e.g., insulation tape 16, or moving the laser beam 42 via flapping mirrors that scan across and along the insulation material. In still another embodiment, the laser beam 42 is directed through a cylindrical lens to form a line, which may then be directed onto the insulation material. In yet another embodiment, the laser beam 42 is passed through a mask having a plurality of holes therein. This passing generates a number of beams, which can be focused with a lens, providing a plurality of holes on the insulation material, e.g., insulation tape 16.

In accordance with yet another aspect of the present invention, there is a method for using any embodiment of an insulation tape 16 as described herein having a plurality of apertures 26 formed therein. The method comprises wrapping the insulation tape 16 around an electrical conductor and impregnating the insulation tape 16 with an impregnating resin. The plurality of apertures 26 in the insulation tape 16 allows for improved impregnation of the resin while maintaining the structural stability and electrical strength of the insulation tape 16.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An electrical insulation material comprising an electrical insulation layer comprising a plurality of apertures formed therein, wherein the apertures have a largest dimension of ten microns or less, and wherein the electrical insulation layer comprises mica.

2. The electrical insulation material of claim 1, wherein the electrical insulation material is in the form of a structurally stable mica sheet.

3. A method of manufacturing an electrical insulation material comprising:
   forming a plurality of apertures in the electrical insulation material;
   wherein the electrical insulation material comprises a first component and a second component, and wherein the forming comprises selectively removing the first component from the electrical insulation material while leaving said second component substantially intact; and
   wherein the electrical insulation material comprises an insulation layer comprising mica.

4. The method of claim 3, wherein the apertures have a largest dimension of ten microns or less.

5. The method of claim 3, wherein the electrical insulation material comprises an electrical insulation tape comprising an insulation layer bonded to a backing layer, and wherein the apertures are formed in each of the insulation layer and the backing layer.

6. The method of claim 3, wherein the forming is done by laser drilling.

7. The method of claim 3, wherein the second component comprises a high thermal conductivity material.

8. The electrical insulation material of claim 1, wherein the plurality of apertures have a depth that only partially extends through the electrical insulation layer.

9. The electrical insulation material of claim 1, wherein the electrical insulation layer further comprises a plurality of high thermal conductivity (HTC) fillers.

10. The electrical insulation material of claim 1, wherein the electrical insulation material comprises an electrical insulation tape.

* * * * *